(12) United States Patent
Kim

(10) Patent No.: US 6,450,297 B1
(45) Date of Patent: Sep. 17, 2002

(54) HERMETIC COMPRESSOR

(75) Inventor: Chul-Sung Kim, Kwangju (KR)

(73) Assignee: Samsung Kwangju Electronics Co., Ltd. (KR)

( * ) Notice: Subject to any disclaimer, the term of this patent is extended or adjusted under 35 U.S.C. 154(b) by 35 days.

(21) Appl. No.: 09/599,965

(22) Filed: Jun. 23, 2000

(30) Foreign Application Priority Data

Jun. 25, 1999 (KR) .......................................... 99-24204

(51) Int. Cl.⁷ ................................................ F01M 1/00
(52) U.S. Cl. ........................ 184/6.16; 184/6.18; 92/160
(58) Field of Search .............................. 184/6.16, 6.18; 92/160

(56) References Cited

U.S. PATENT DOCUMENTS

| | | | | |
|---|---|---|---|---|
| 5,118,263 A | * | 6/1992 | Fritchman | 471/415 |
| 5,191,863 A | * | 3/1993 | Hagiwara | 123/59 AC |
| 5,313,875 A | * | 5/1994 | Kadlicko | 92/157 |
| 5,839,351 A | * | 11/1998 | Nakada | 92/160 |
| 6,089,352 A | * | 7/2000 | Kim et al. | 184/6.16 |
| 6,135,008 A | * | 10/2000 | Soupal et al. | 92/160 |
| 6,138,634 A | * | 10/2000 | Kusche et al. | 184/6.18 |

* cited by examiner

Primary Examiner—Chong H. Kim
(74) Attorney, Agent, or Firm—Burns, Doane, Swecker & Mathis, LLP

(57) ABSTRACT

There is provided a hermetic compressor in which an oil hole is directly formed in an inner wall of a piston hole on which a lateral component force is exerted, thereby intensively performing a lubricating action at the portion which is susceptible to the friction and wear. Further, since the oil hole is formed to penetrate through the side wall of the piston hole, a foreign matter contained in the oil is prevented from being introduced into the piston hole. Further, the friction and wear between the piston and the cylinder block is basically prevented, thereby preventing the lowering of the performance and the deformation of the compressing instrument by the increasing of the interior temperature of the compressor.

2 Claims, 5 Drawing Sheets

HERMETIC COMPRESSOR

BACKGROUND OF THE INVENTION

1. Field of the Invention

The present invention relates to a hermetic compressor, more particularly, a hermetic compressor in which an oil supplying hole for supplying oil between a piston and a cylinder block is formed to pass through an inner wall of( a piston hole in which a lateral pressure of the piston is generated so as to improve a lubricating action for the piston.

2. Description of the Related Art

As shown in FIG. 1, a conventional hermetic compressor comprises a compressing instrument 20 and an electric instrument 30.

The compressing instrument 20 comprises a bearing 21 which is upright mounted at a center portion of a sealed housing 10, a crankshaft 23 which is rotatably mounted in the bearing 10 and provided with a eccentric shaft 22 at a lower portion thereof, a cylinder block 24 which is fixedly disposed at a lower portion of the bearing 21, a connecting rod 25 which is coupled to the eccentric shaft 22 of the crankshaft 23, a piston 26 which is mounted at an end of the connecting rod 25 so as to linearly reciprocate within the cylinder block 24, and a head cover 27 which is disposed at an end of the cylinder block 24 and formed with a suction and discharge valve (not shown) as means for sucking and discharging refrigerant.

And, the electric instrument 30 comprises a rotor 31 which is coupled to the crankshaft 23 so as to rotate along with the crankshaft 23, and a stator 32 which is disposed around the rotor 31 in the sealed housing 10 so as to generate an electromagnetic force by which the rotor 31 is rotated.

At a lower portion in the sealed housing 10, there is provided cooling oil 0. The cooling oil is supplied to each sliding member by a lubricating means so as to prevent a friction and wear between the sliding members.

In an example of the lubricating means, as shown in FIG. 2, there is formed a small diameter portion 41 at a middle portion of the crankshaft 23 which is inserted into the bearing 21. Between the small diameter portion 41 and an inner wall of the bearing 21, there is formed an oil bank in which the oil 0 is stored. A lower oil supplying groove 43 and an upper oil supplying groove 44 are respectively formed at each outer face of a lower and upper portions of the crankshaft 23 with the small diameter portion 41 in the center. An oil supplying hole 45, which is communicated with the lower oil supplying groove 43, is formed within the eccentric shaft 22 which is provided to the lower portion of the crankshaft 23. The oil supplying hole 45 is connected with an oil pickup tube 46. Further, at an edge of the upper end of the bearing, there is formed a guiding groove 47 for guiding the oil 0.

In the conventional hermetic compressor as described above, if power source is applied to the compressor, the rotor 31 is rotated by the electromagnetic action between the stator 32 and the rotor 31. The crankshaft 23, which is coupled to the rotor 31, is rotated. Due to the rotation of the crankshaft 23, the eccentric shaft 22 disposed at the lower portion or the crankshaft 23 is also rotated. Therefore, the piston 26, which is coupled to the end of the connecting rod 25, is linearly reciprocated in the cylinder block 24 so that the suction, compression and discharge operations of the refrigerant are performed.

Meanwhile, when the crankshaft 23 is rotated, the oil 0 stored in the lower portion of the sealed housing 10 is sucked through the oil pickup tube 46 which is coupled to the lower portion of the eccentric shaft 22. The sucked oil 0 is moved upward through the oil supplying hole 45 and the oil supplying groove 43 and supplied to the outer face of the bearing 21. The sucked oil 0 is also supplied between the piston 26 and cylinder block 24 so that the piston 26 is smoothly reciprocated.

As described above, when the crankshaft 23 is rotated, the oil 0 is supplied to each sliding members of the compressor and then returned to the lower portion of the sealed housing 10, repeatedly.

In the conventional hermetic compressor, however, when the refrigerant is compressed, the compression force of the piston 26 is characterized by a longitudinal component force Fv and a lateral component force Fs. At this time, a clearance between the inside wall of the cylinder block 24 and the outside wall of the piston 26 is different according to the positions where the lateral component force Fs is applied or not applied (Cs1>>Cs2).

Therefore, when manufacturing the piston 26 and the cylinder block 24, if a machining error is generated and a foreign matter is introduced therein, an oil film is instantaneously and repeatedly destroyed in a portion between the outer wall of the piston 26 and the inner wall of the cylinder block 24, on which the lateral component force is exerted. Therefore, the lubricating action is not performed smoothly so that the friction and wearing is generated in the portion on which the lateral component force is exerted.

In the conventional mechanism, as shown in FIG. 4, since the oil 0 sucked through the oil suppling hole 45 is supplied to oil hole 24a formed at a center portion of the cylinder block 24 corresponding to a center of the piston 26, there is a problem that the oil 0 is not supplied sufficiently to the portion on which the lateral component force is exerted.

Further, there is other problem that an internal temperature of the compressor is increased by a frictional heat so as to lower the performance and the compressing implement is deformed so as to lower the confidence thereof.

SUMMARY OF THE INVENTION

It is therefore an object of the present invention to provide a hermetic compressor which has an improved lubricating structure of the piston in order to prevent the friction and wear between the piston and the cylinder block.

To achieve the above objects and other advantages, there is provided a hermetic compressor in which an oil hole is formed in the cylinder block so as to penetrate through a piston hole of the cylinder block so that oil sucked through an oil supplying hole of a crankshaft by rotation of the crankshaft is passed through the piston hole when the oil is dispersed, characterized in that the oil hole is formed at an interior wall of the piston, on which a lateral component force is exerted when the piston is reciprocated in the piston hole of the cylinder block.

Preferably, the oil hole has a larger upper diameter which is at an upper portion of the piston hole than a lower diameter which is at a lower portion of the piston hole.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully here in after with reference to the accompanying drawings, in which preferred embodiments of the invention are shown.

Figure 1:
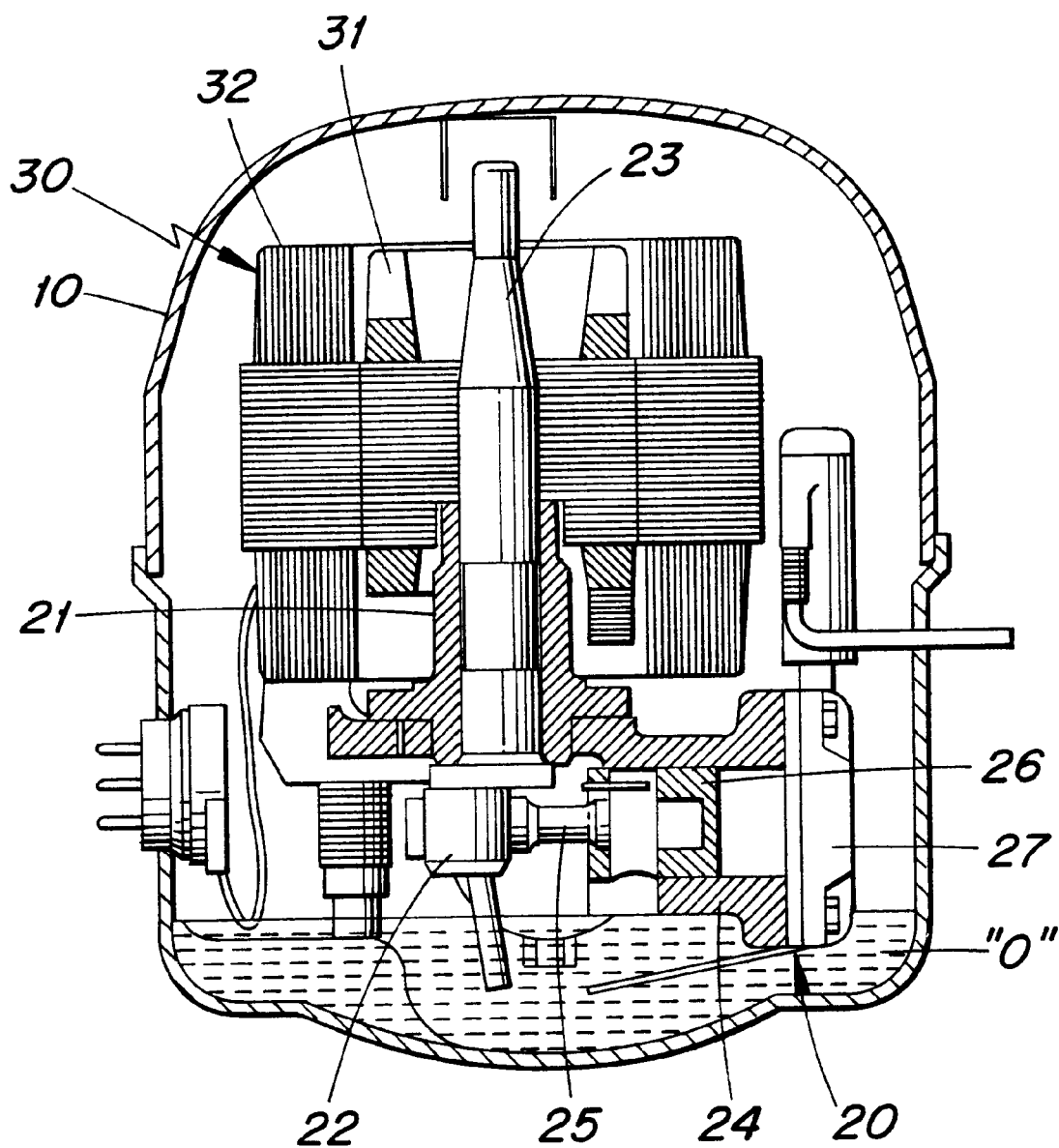
FIG. 1 is a longitudinal cross-sectional view of a conventional hermetic compressor.
Figure 2:
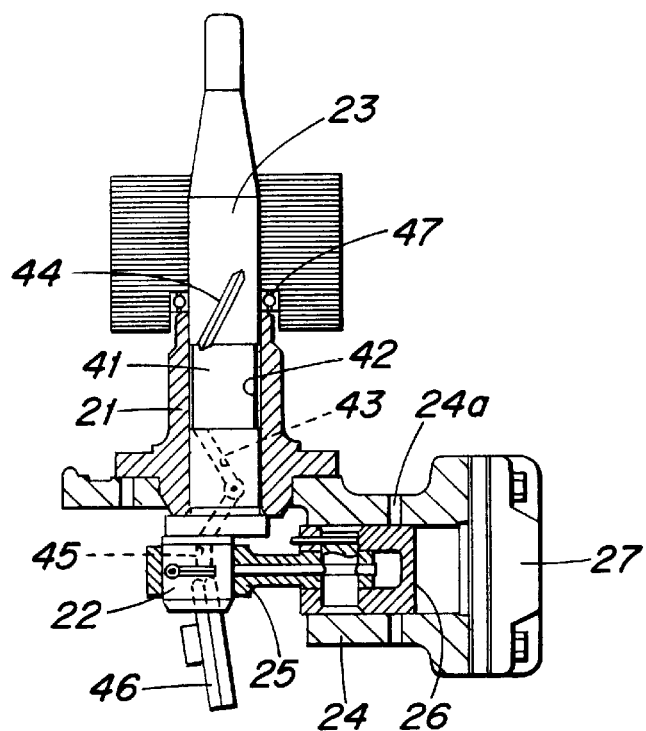
FIG. 2 is a schematic cross-sectional view showing a state of a lubricating action of the conventional hermetic compressor.
Figure 3:
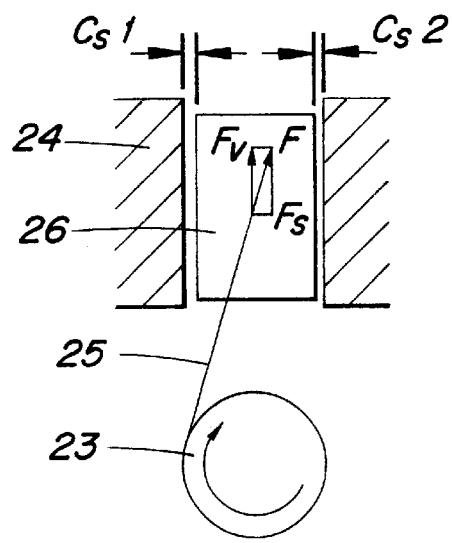
FIG. 3 is a cross-sectional view taken through a cylinder block of the compressor of FIG. 2, along a line coinciding with an axis of a cylinder bore and oriented perpendicular to an axis of a compressor crankshaft.
Figure 4:
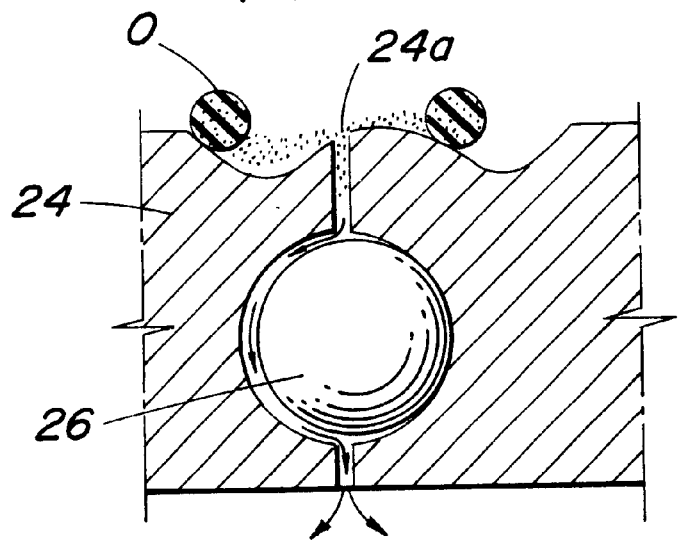
FIG. 4 is a cross-sectional view taken along line extending through a lubrication hole of the cylinder block of FIG. 2, in a direction perpendicular to the axis of the cylinder bore.
Figure 5:
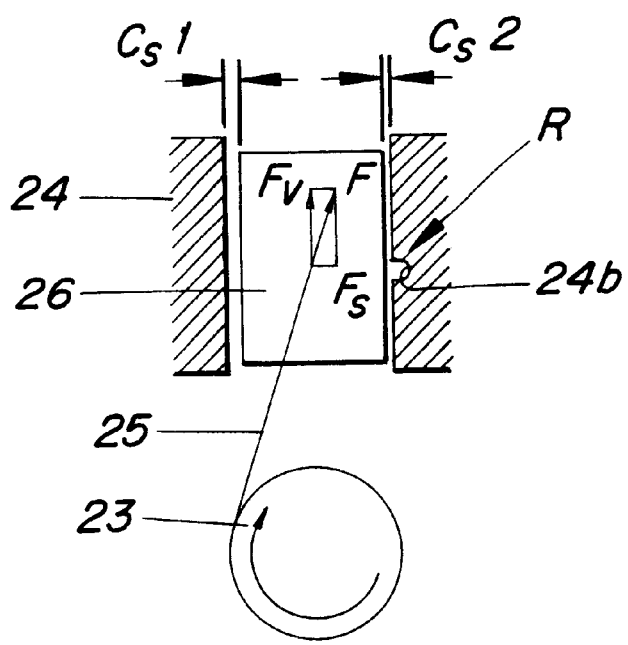
FIG. 5 is a cross-sectional view similar to FIG. 3, taken through a cylinder block according to the present invention, to show a lubrication hole thereof.
Figure 6:
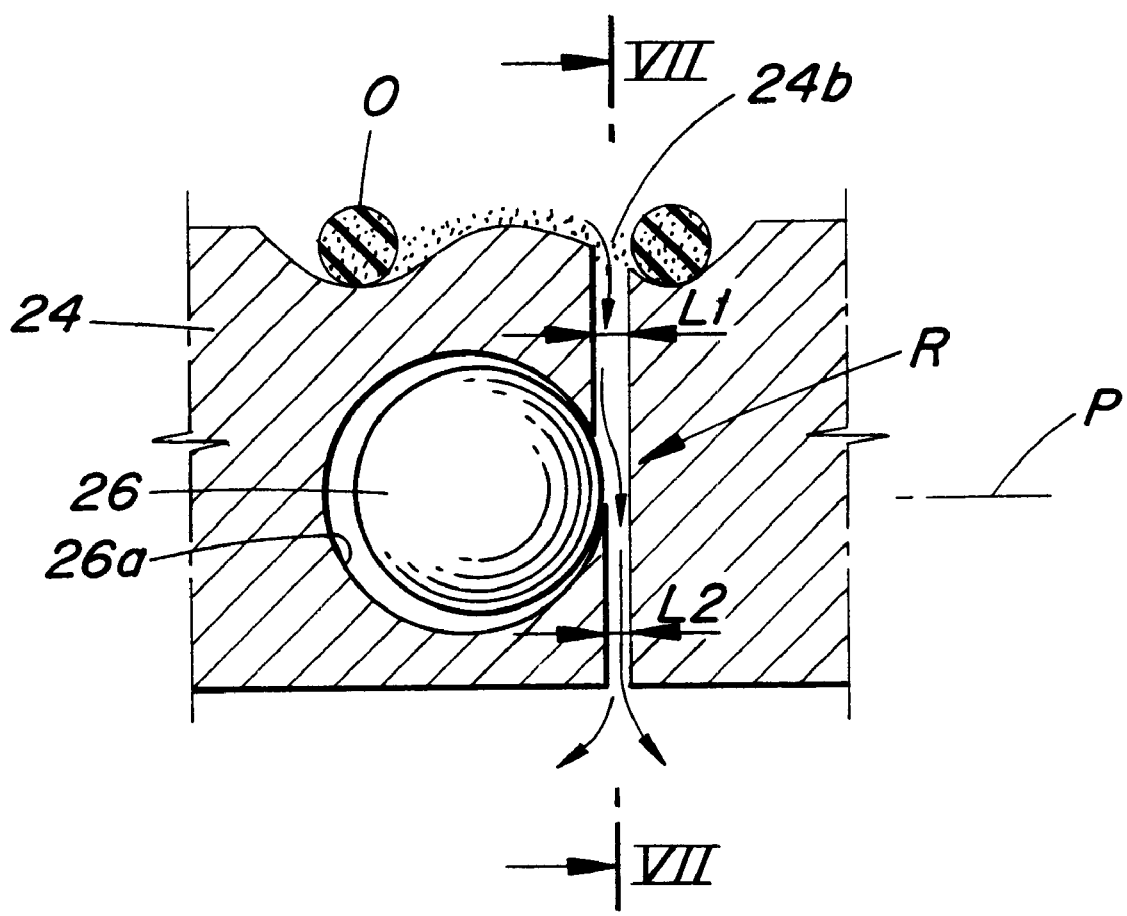
FIG. 6 is a cross-sectional view similar to FIG. 4, taken through the cylinder block according to the present invention, to show the lubrication hole thereof.
Figure 7:
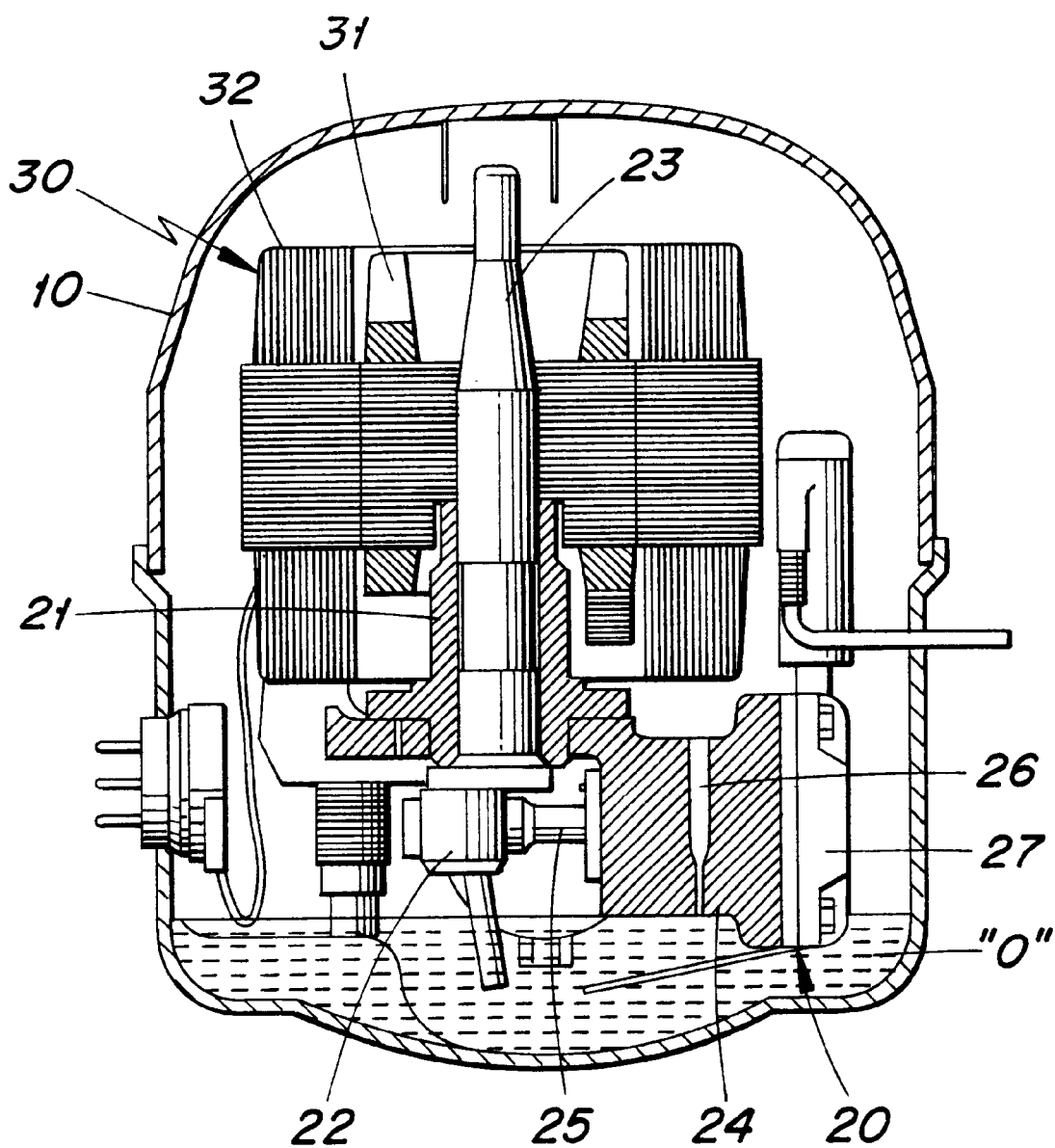
FIG. 7 is a sectional view of a compressor according to the invention, with the section line VII—VII shown in FIG. 6 depicting how the section plane passes through the cylinder block part of the compressor.

FIG. 5 is a cross-sectional view taken along a line A–A' in FIG. 2 go show a lubricating state according to the present invention and FIG. 6 is a cross-sectional view taken along a line B–B' in FIG. 2 show a lubricating state according to the present invention.

As shown in FIGS. 5 and 6, the hermetic compressor apparatus according to the present invention is provided with a sealed housing 10 which has a sealed space therein. In the sealed housing 10, there are disposed a driving portion 30 and a compressing portion 20.

The driving portion 110 comprises a compressing instrument 20 which is provided with a sealed housing 10, a bearing 21 which is upright mounted at a center portion of a sealed housing 10, a crankshaft 2a which is rotatably mounted in the bearing 10 and provided with a eccentric shaft 22 at a lower portion thereof, a cylinder block 24 which is fixedly disposed at a lower portion of the bearing 21, a connecting rod 25 which is coupled to the eccentric shaft 22 of the crankshaft 23, a piston 26 which is mounted at an end of the connecting rod 25 so as to linearly reciprocate within the cylinder block 24, and a head cover 27 which is disposed at an end of the cylinder block 24 and formed with a suction and discharge valve (not shown) as means for sucking and discharging refrigerant; and the driving portion 30 which is provided with a rotor 31 which is coupled to the crankshaft 23 so as to rotate along with the crankshaft 23, and a stator 32 which is disposed around the rotor 31 in the sealed housing 10 so as to generate an electromagnetic force by which the rotor 31 is rotated. The connecting rod moves within a horizontal plane P which intersects a wall of a piston bore 26a at two regions (see FIG. 6).

In addition, cooling oil 0 is stored at a lower portion of the sealed housing 10. There is formed a small diameter portion 41 at a middle portion of the crankshaft 23 which is inserted into the bearing 21. Between the small diameter portion 41 and an inner wall of the bearing 21, there is formed an oil bank in which the oil 0 is stored. A lower oil supplying groove 43 and an upper oil supplying groove 44 are respectively formed at each outer face of a lower and upper portions of the crankshaft 23 with the small diameter portion 41 in the center. An oil supplying hole 45, which is communicated with the lower oil supplying groove 43, is formed within the eccentric shaft 22 which is provided to the lower portion of the crankshaft 23. The oil supplying hole 45 is connected with an oil pickup tube 46. Further, at an edge of the upper end of the bearing, there is formed a guiding groove 47 for guiding the oil 0, thereby preventing the friction and wear between the sliding members. As described above, the structure of the lubricating means is similar to the conventional one.

According to the present invention, an oil hole 24b formed through the cylinder block 24 is formed at a side wall of the piston hole or bore 26a on which a lateral component force of the piston 26 is exerted. That is, the oil hole 24b is oriented generally tangentially relative to a region R where the plane P intersects a wall of the bore 26a and against which the piston tends to be urged by the connecting rod 25 (see FIG. 6).

The oil hole 24b, which is formed through the cylinder block 24, may have a constant diameter over the entire length thereof. Preferably, an upper diameter L1 of an inlet portion of the oil hole 24b, which is at an upper portion of the piston hole 26a, is formed to be larger than a diameter L2 of an outlet portion of the oil hole 24b which is at a lower portion of the piston hole 26a (L1>L2).

If the upper diameter L1 of the oil hole 24b is formed to be larger than the lower diameter L2 of the oil hole 24b, as described above, an amount of the oil, which is supplied to the oil hole 24b, is larger than an amount of the oil which is dropped to the lower portion of the sealed housing 10. Therefore, a flow rate of the oil is increased at a portion in which the oil hole 24b is communicated with the piston hole 26a so that the oil is sufficiently supplied.

Here, the lubricating action in the hermetic compressor according to the present invention will be described more fully.

If power source is applied to the compressor, the piston 26 is linearly reciprocated in the cylinder block 24 so that the suction, compression and discharge operations of the refrigerant are performed. When the crankshaft 23 is rotated, the oil 0 stored in the lower portion of the sealed housing 10 is sucked through the oil pickup tube 46 which is coupled to the lower portion of the eccentric shaft 22. The sucked oil 0 cools a surface of the cylinder block 24 and is also supplied through the oil hole 24b between the piston 26 and cylinder block 24.

At this time, since the oil hole 24b is formed at the side wall of the piston hole 26a on which the lateral component force of the piston 26 is exerted, the oil 0 is supplied to an clearance which is more narrowed by the lateral component force so that the lubricating action is facilely performed between the piston and the cylinder block.

Particularly, since the upper diameter L1 of the oil hole 24b is larger than the lower diameter L2 of the oil hole 24b, the oil 0 supplied through the oil hole 24b is sufficiently supplied to the portion which is communicated with the piston hole 26a, i.e. on which the lateral component force is exerted. Therefore, the foreign matter contained the oil, such as metal chip F, is not introduced into the clearance and dropped to the lower side.

As disclosed above, according to the piston lubricating structure of the hermetic compressor of the present invention, the oil hole is directly formed in the inner wall of the piston hole on which the lateral component force is exerted, thereby intensively performing the lubricating action at the portion which is susceptible to the friction and wear. Further, since the oil hole is formed to penetrate through the side wall of the piston hole, the foreign matter contained in the oil is prevented from being introduced into the piston hole.

Therefore, according to the present invention, the friction and wear between the piston and the cylinder block is basically prevented, thereby preventing the lowering of the performance and the deformation of the compressing instrument by the increasing of the interior temperature of the compressor.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. A hermetic compressor comprising:

a housing forming an oil reservoir;

a cylinder block including a bore disposed within the housing, the bore defined by a cylindrical bore wall;

a piston mounted for reciprocation in the bore for compressing a fluid;

a motor;

a crankshaft driven by the motor and including an eccentric shaft;

a connecting rod interconnecting the eccentric shaft and the piston, the connecting rod reciprocating within a plane containing a center axis of the piston; and an oil supplying hole formed in the cylinder block for conducting oil from the oil reservoir to the bore, the oil supplying hole extending generally tangentially relative to the bore wall and intersecting the bore wall substantially at a region where the plane intersects the bore wall and against which the piston is urged by the connecting rod with a lateral force greater than any lateral force with which the piston bears against the bore wall at all other remaining circumferential regions thereof.

2. The compressor according to claim 1 wherein the oil supplying hole includes an inlet portion extending to the region, and an outlet portion extending away from the region, the inlet portion having a larger cross section than the outlet portion.

* * * * *